(12) United States Patent
Mahood

(10) Patent No.: US 6,492,486 B1
(45) Date of Patent: Dec. 10, 2002

(54) METHOD OF MAKING POLYCARBONATES

(75) Inventor: James Mahood, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/681,378

(22) Filed: Mar. 27, 2001

Related U.S. Application Data

(60) Provisional application No. 60/254,359, filed on Dec. 8, 2000, provisional application No. 60/254,357, filed on Dec. 8, 2000, and provisional application No. 60/254,397, filed on Dec. 8, 2000.

(51) Int. Cl.$^7$ .............................................. C08G 64/00
(52) U.S. Cl. ........................ 528/196; 528/198; 525/461; 525/462
(58) Field of Search .............................. 528/196, 198; 525/461, 462

(56) References Cited

U.S. PATENT DOCUMENTS

| | | |
|---|---|---|
| 4,129,546 A | 12/1978 | Axelrod |
| 4,806,297 A * | 2/1989 | Brown et al. ............... 528/212 |
| 4,948,871 A | 8/1990 | Fuknoka et al. |
| 5,204,377 A | 4/1993 | Fukawa et al. |
| 5,214,073 A | 5/1993 | Fukawa et al. |
| 5,480,959 A | 1/1996 | Schmidhauser |
| 5,580,951 A | 12/1996 | Silva et al. |

FOREIGN PATENT DOCUMENTS

| | | |
|---|---|---|
| EP | 0 982 340 | 3/2000 |
| JP | 9-068817 | 3/1997 |

* cited by examiner

*Primary Examiner*—Terressa M. Boykin
(74) *Attorney, Agent, or Firm*—Oppedahl & Larson LLP

(57) ABSTRACT

Copolymers of BPA, BPT-1 and BPT-2, can be used as a modifier to enhance the thermal properties of a BPA polymer. A single copolymer modifier can be used in differing amounts to produce a product with desired thermal properties. Thus, polycarbonate can be made by combining a bisphenol A polycarbonate and a BPA/BPT-1/BPT-2 copolymer modifier, and mixing the combined materials to form a blend. By adjusting the relative amounts and the properties of the bisphenol A polycarbonate and BPA/BPT-1/BPT-2 copolymer, the glass transition temperature and the toughness of the blend can be selected. Suitable BPA/BPT-1/BPT-2 copolymers contain BPT-1 and BPT-2 in a ratio, BPT-1/BPT-2, in the range of 70/30 to 10/90, preferably less than or equal to 50/50, for example around 30/70.

26 Claims, 1 Drawing Sheet

METHOD OF MAKING POLYCARBONATES

CROSS REFERENCE TO RELATED APPLICATIONS

This application claims the benefit of U.S. Provisional Application No. 60/254,359, filed Dec. 8, 2000, which application is incorporated herein by reference. This application is related to U.S. Provisional Patent Applications Ser. Nos. 60/254,357 and 60/254,397 both filed Dec. 8, 2000, and to U.S. Patent Applications claiming the benefit therefrom and filed concurrently herewith, all of which are incorporated herein by reference.

BACKGROUND OF INVENTION

This application relates to polycarbonate blends which have enhanced thermal properties as compared to BPA and to a method of making same.

Polycarbonates are a well known class of high impact resistant thermoplastic resins characterized by optical clarity, high ductility as well as other advantageous properties. They are frequently employed as lenses and windows as a result of their transparency.

Bisphenol A (BPA) polycarbonate is the predominant commercially available resin of this type. It is derived from 2,2-bis(4-hydroxyphenyl)propane and ordinarily has a glass transition temperature of about 150° C. It is of increasing interest to prepare polycarbonates which, while retaining the ductility of BPA, have higher glass transition temperatures and are therefore more resistant to softening when heated. Polycarbonates possessing increased glass transition temperatures are very desirable, for instance, in the automotive and aircraft industries. Particularly, they may be used in the preparation of automotive headlamp lenses which are becoming smaller in size and characterized by closer proximity of the lenses to the heat-generating light source.

Current approaches to high heat polycarbonate involve polymerizing BPA with a monomer with that increases the copolymer glass transition temperature (Tg). This improvement usually comes at the expense of other polymer properties. For example, Bayer has commercialized a family of copolymers based on Bisphenol I, which provide higher Tg at the expense of reduced ductility. Bayer APEC DP9-9340 resin gives a Tg of 177° C. and a 23° C. notched izod impact of 6 ft-lb/in, as compared to a Tg of 150° C. and a 23° C. notched izod impact of 14–16 ft-lbs/in for BPA homopolymer.

U.S. Pat. No. 5,480,959 disclosed substantially pure bisphenols; in particular, 4-[1-[3-(4-hydroxyphenyl)-4-methylcyclohexyl]-1-methylethyl]phenol (hereinafter referred to as BPT-1) and 4,4'-[1-methyl-4-(1-methylethyl)-1,3-cyclohexandiyl]bisphenol (hereinafter referred to as BPT-2). These materials can be used to make homopolycarbonates that possess increased glass transition temperatures on the order of about 198° C. when employing BPT-1 and about 249° C. when employing BPT-2. Unfortunately, these materials do not have the toughness of BPA polycarbonates.

A copolymer of BPT-1 and BPA (35:65 mol %) was reported to have a glass transition temperature of 171° C. and a 23° C. notched Izod impact strength of about 3.8 ft-lbs/in. The production of copolymers to attain specific characteristics is not optimum, however, because it requires a separate manufacturing run for each type of product. This increases the cost. Thus, a preferred approach to the manufacture of products with a spectrum of characteristic properties is to have a limited number of feedstock polymers which can be blended to arrive at mixtures with the desired properties. In the case of BPA polycarbonates, one seeming option would be mixing BPA polycarbonates with BPT-1 or BPT-2 polycarbonates to arrive at blends having high Tg values. This approach has not worked, however, because BPA polycarbonate is not miscible with BPT-1 or BPT-2 polycarbonates.

It would be desirable to have a method for modifying the thermal characteristics of polycarbonate to increase the glass transition temperature, that does not result in a significant degradation of the impact properties of the polymer, and which can be carried out using blends of a limited number of feedstock polymers.

SUMMARY OF INVENTION

It has now been determined that a copolymers of BPA, BPT-1 and BPT-2, can be used as a modifier to enhance the thermal properties of a BPA polymer. A single copolymer modifier can be used in differing amounts to produce a product with desired thermal properties. Thus, the present invention provides a method for making a polycarbonate comprising the steps of (a) combining a bisphenol A polycarbonate and a BPA/BPT-1/BPT-2 copolymer modifier, and (b) mixing the combined materials to form a blend. By adjusting the relative amounts and the properties of the bisphenol A polycarbonate and BPA/BPT-1/BPT-2 copolymer, the glass transition temperature and the toughness of the blend can be selected. Suitable BPA/BPT-1/BPT-2 copolymers contain BPT-1 and BPT-2 in a ratio, BPT-1/BPT-2, in the range of 70/30 to 10/90, preferably less than or equal to 50/50, for example around 30/70.

DETAILED DESCRIPTION

Figure 1:
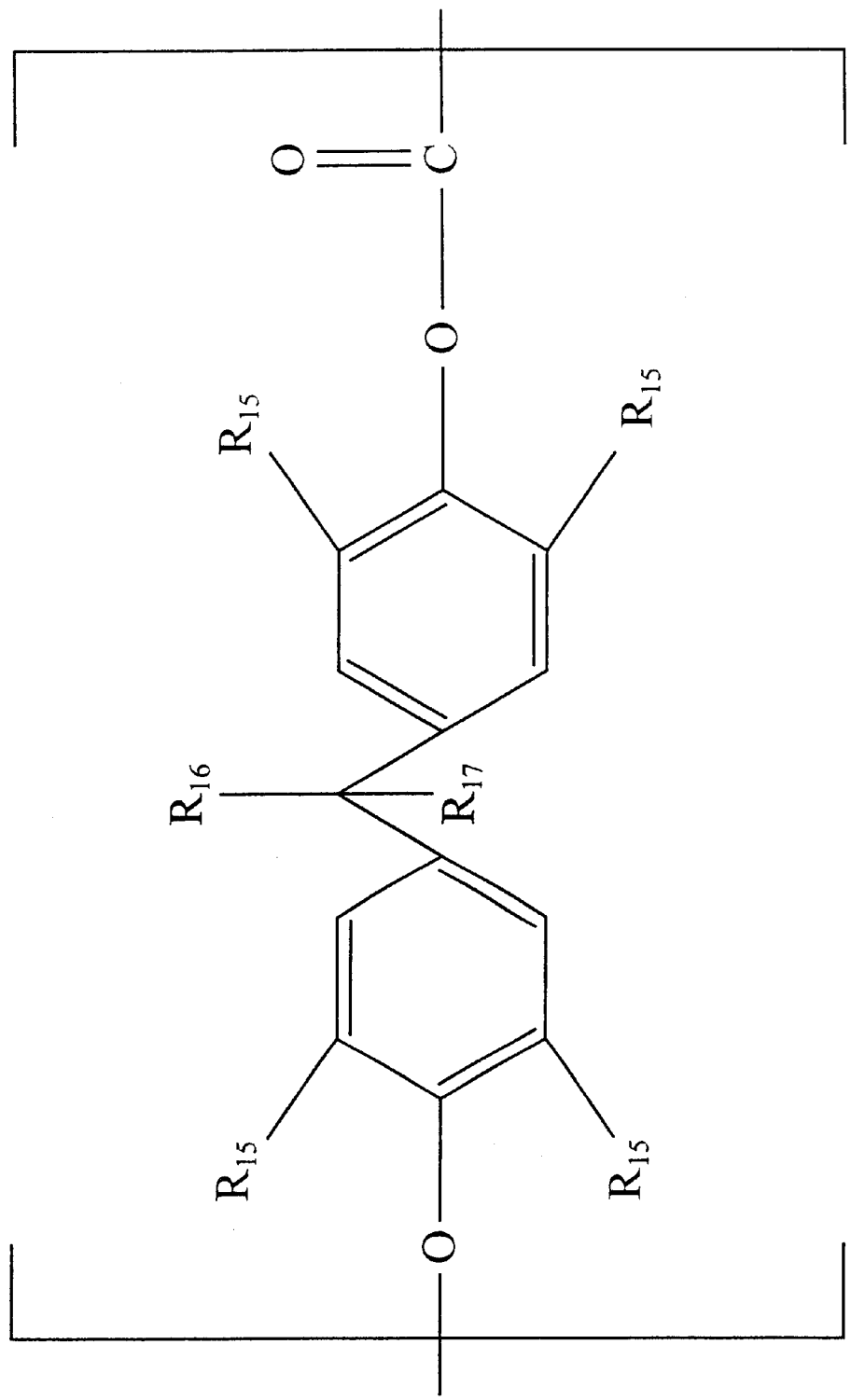
FIG. 1 shows the structure of a type of phenol useful in making polycarbonates in accordance with the invention.

The present invention provides a method for making modified bisphenol A polycarbonate polymers to achieve enhanced glass transition temperatures without substantial loss of toughness.

As used in the specification and claims of this application, the term "bisphenol A polycarbonate polymer" refers to homopolymers of bisphenol A and to copolymers of bisphenol A and modifying comonomers selected to alter the properties of the bisphenol A polycarbonate polymer. Such comonomers include additional dihydric phenol comonomers known for use in the production of polycarbonates, including but not limited to those phenols which can be employed in the synthesis of polycarbonates having the general formula shown in FIG. 1, where $R_{15}$ is selected independently from the group consisting of H and $C_1$–$C_3$ alkyl, and $R_{16}$ and $R_{17}$ are independently $C_1$–$C_6$ alkyl or aryl. In general, these additional comonomers will be limited to amounts of less than 20% by weight.

In accordance with the invention, a modifying copolymer is blended with the bisphenol A polycarbonate polymer. This modifying copolymer comprises copolymerized residues of BPA, BPT-1 and BPT-2. Suitable BPA/BPT-1/BPT-2 copolymers contain BPT-1 and BPT-2 in a ratio, BPT-1/BPT-2, in the range of 70/30 to 10/90, preferably less than or equal to 50/50, for example around 30/70. (It should be noted that BPT-1 and BPT-2 are isomers and that they therefore have the same molecular weight. Thus, the ratio of BPT-1 to BPT-2 is the same, whether it is on a molar or weight basis). The amount of BPA in the modifying copolymer is at least 20 mol %, for example 20 to 75 mol %, and preferably 35–50 mol %.

In accordance with the method of the invention, the BPA polycarbonate polymer and the modifying copolymer are combined and mixed to form a blend, for example at elevated temperature in an extruder. In the blends of the invention, the relative amounts of the components are selected to provide the desired final values for Tg and toughness. The modifying copolymer is generally present in an amount of 5 to 60 mol %. Higher amounts of modifying copolymer tend to increase Tg and decrease toughness, although only to a modest extent. In addition, as noted in example 3 below, loss of miscibility may occur when the amount of modifying polymer is too high. The BPA polycarbonate polymer is generally present in an amount of from 95 to 40 mol %. Higher amounts of BPA polycarbonate polymer tend to decrease Tg and increase toughness.

The invention will now be further described with reference to the following, non-limiting examples.

EXAMPLE 1

Bisphenol A (29.4 g, 0.13 mol) and a 30/70 blend of BPT1/BPT2 (41.6 g, 0.13 mol) were charged to a 2 L agitated reactor along with methylene chloride (500 L), water (300 L), triethylamine (0.5 ml) and p-cumylphenol (1.61 g). Phosgene (30 g, 0.3 mol) was added at 2 g/min rate while the pH was held at 10.0–10.50 by controlled addition of a 50% caustic solution. The resulting polymer solution was separated from the brine layer, washed with dilute HCl solution, and then washed with water until the level of titratable chloride was less than 3 ppm. The polymer solution was slowly added to hot water, and the precipitated resin was dried at 115° C. for 6 hours. The resulting resins were used as a modifying copolymer in accordance with the invention. As a control, a control copolymer was prepared from the menthane bisphenol monomers without BPA.

EXAMPLE 2

The modifying copolymers and the control copolymer of Example 1 and BPA homopolymer (100 grade LEXAN polycarbonate) were dissolved in 2:1, 1:1 and 1:2 ratios by weight to give 10% solutions in methylene chloride. The clear solutions were used to cast films, and the films were dried overnight. Tg values for the films were determined by DSC. In the films prepared with the control copolymer, two Tg values were observed. In contrast, in the films prepared with the modifying copolymer, a single Tg value was obtained, indicating that the BPA homopolymer and the modifying copolymer were miscible. Table 1 shows the values of Tg obtained.

TABLE 1

| mol % menthane bisphenol in modifying copolymer | ratio of modifying copolymer:BPA | Tg (degrees C.) |
|---|---|---|
| 25 | 2:1 | 159 |
| 25 | 1:1 | 156 |
| 25 | 1:2 | 154 |
| 50 | 2:1 | 176 |
| 50 | 1:1 | 169 |
| 50 | 1:2 | 156 |

EXAMPLE 3

The experiment of Example 2 was repeated except that the modifying copolymer was prepared using 75mol % of the 30/70 menthane bisphenol mixture to extend the invention to higher values of Tg. The 75% modifying copolymer was mixed with BPA homopolymer at ratios of 2:1, 1:1 and 1:2 by weight. The films produced from the resulting mixtures exhibited two Tg values, indicating that modifying copolymer was not miscible with the BPA at these levels.

What is claimed is:

1. A method for making a polycarbonate blend comprising the steps of:
   (a) combining a bisphenol A polycarbonate polymer and a modifying copolymer, wherein the bisphenol A polycarbonate polymer and the modifying copolymer are different materials; and
   (b) mixing the combined materials to form a homogeneous blend;
   wherein the modifying copolymer comprises residues of bisphenol A, 4-[1-[3-(4-hydroxyphenyl)-4-methylcyclohexyl]-1-methylethyl]phenol (hereinafter referred to as BPT-1) and 4,4'-[1-methyl-4-(1-methylethyl)-1,3-cyclohexandiyl] bisphenol (hereinafter referred to as BPT-2), wherein BPT-1 and BPT-2 residues are present in the modifying copolymer in a ratio, BPT-1/BPT-2, that is less than or equal to 1/1.

2. The method of claim 1, wherein the modifying-copolymer comprises 75 to 40 mol % bisphenol A residues, and 25 to 60 mol % of BPT-1 and BPT-2 residues combined.

3. The method of claim 1, wherein the modifying copolymer comprises about 50 mol % bisphenol A residues.

4. The method of claim 1, wherein the modifying copolymer comprises a 70/30 ratio of BPT-2 to BPT-1.

5. The method of claim 1, wherein the bisphenol A polycarbonate polymer is a bisphenol A homopolymer.

6. The method of claim 5, wherein the modifying copolymer comprises 75 to 40 mol % bisphenol A residues, and 25 to 60 mol % of BPT-1 and BPT-2 residues combined.

7. The method of claim 5, wherein the modifying copolymer comprises about 50 mol % bisphenol A residues.

8. The method of claim 5, wherein the modifying copolymer comprises a 70/30 ratio of BPT-2 to BPT-1.

9. The method of claim 1, wherein the bisphenol A polycarbonate polymer comprises copolymers of bisphenol A and modifying comonomers, wherein the modifying comonomers are selected from the group consisting of dihydric phenol comonomers having the general formula:

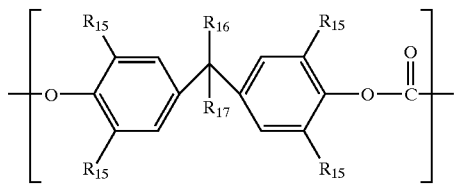

wherein $R_{15}$ is selected independently from the group consisting of H and $C_1$–$C_3$ alkyl, and $R_{16}$ and $R_{17}$ are independently $C_1$–$C_6$ alkyl or aryl.

10. The method of claim 9, wherein the modifying copolymer comprises 75 to 40 mol % bisphenol A residues, and 25 to 60 mol % of BPT-1 and BPT-2 residues combined.

11. The method of claim 9, wherein the modifying copolymer comprises about 50 mol % bisphenol A residues.

12. The method of claim 9, wherein the modifying copolymer comprises a 70/30 ratio of BPT-2 to BPT-1.

13. The method of claim 1, wherein the modifying copolymer comprises at least 20 mol % bisphenol A residues.

14. The method of claim 1, wherein the modifying copolymer comprises from 35 to 50 mol % bisphenol A residues.

15. The method of claim 1, wherein the modifying copolymer is present in the homogeneous blend in an amount of 5 to 60 mol %.

16. The method of claim 15, wherein the modifying copolymer comprises 75 to 40 mol % bisphenol A residues, and 25 to 60 mol % of BPT-1 and BPT-2 residues combined.

17. The method of claim 15, wherein the modifying copolymer comprises about 50 mol % bisphenol A residues.

18. The method of claim 15, wherein the modifying copolymer comprises 70/30 ratio of BPT-2 to BPT-1.

19. The method of claim 15, wherein the modifying copolymer comprises at least 20 mol % bisphenol A residues.

20. The method of claim 15, wherein the modifying copolymer comprises from 35 to 50 mol % bisphenol A residues.

21. The method of claim 1, wherein the bisphenol A polycarbonate polymer is present in the homogeneous blend in an amount of 95 to 40 mol %.

22. The method of claim 21, wherein the modifying copolymer comprises 75 to 40 mol % bisphenol A residues, and 25 to 60 mol % of BPT-1 and BPT-2 residues combined.

23. The method of claim 21, wherein the modifying copolymer comprises about 50 mol % bisphenol A residues.

24. The method of claim 21, wherein the modifying copolymer comprises a 70/30 ratio of BPT-2 to BPT-1.

25. The method of claim 21, wherein the modifying copolymer comprises at least 20 mol % bisphenol A residues.

26. The method of claim 21, wherein the modifying copolymer comprises from 35 to 50 mol % bisphenol A residues.

* * * * *